United States Patent [19]
Bossen

[11] 3,889,121
[45] June 10, 1975

[54] APPARATUS FOR MEASURING THE WEIGHT PER UNIT AREA OF A MANUFACTURED SHEET PRODUCT CONSISTING OF A REINFORCING MATERIAL SURROUNDED BY A BULK MATERIAL

[75] Inventor: David A. Bossen, Woodside, Calif.
[73] Assignee: Measurex Corporation, Cupertino, Calif.
[22] Filed: July 12, 1973
[21] Appl. No.: 378,430

[52] U.S. Cl. ................. 250/359; 250/308; 250/360
[51] Int. Cl. ............................................ G01n 23/06
[58] Field of Search..................... 250/308, 359, 360

[56] References Cited
UNITED STATES PATENTS
3,405,267  10/1968  Chope.................................. 250/308
3,681,595  8/1972  Dahlin ............................ 250/308 X Primary Examiner—Archie R. Borchelt
Attorney, Agent, or Firm—Flehr, Hohbach, Test, Albritton & Herbert

[57] ABSTRACT

Apparatus for measuring the weight per unit area of a manufactured sheet product consisting of a skeletal or reinforcing material of variable unknown weight per unit area surrounded by a bulk material also of variable unknown weight per unit area. The apparatus includes a first radiation source and detector which is relatively more sensitive to the reinforcing material than the bulk material, a second radiation source and detector which is relatively more sensitive to the bulk material than to the reinforcing material, and electronic means for combining signals from the first and second detectors to get either total weight per unit area, bulk material weight per unit area, or reinforcing material weight per unit area.

9 Claims, 3 Drawing Figures

APPARATUS FOR MEASURING THE WEIGHT PER UNIT AREA OF A MANUFACTURED SHEET PRODUCT CONSISTING OF A REINFORCING MATERIAL SURROUNDED BY A BULK MATERIAL

BACKGROUND OF THE INVENTION

The present invention relates to weight per unit area measurements of sheet materials. More particularly, it relates to such measurements where the sheet consists of a bulk material surrounding a reinforcing material and provides an apparatus for measuring the total weight, weight of the bulk material, and the weight of the reinforcing material.

The class of materials for which the invention is useful can be defined as sheet products consisting of a skeletal or reinforcing layer bonded to a bulk material layer. And the weight per unit area of both the reinforcing and bulk materials is an unknown variable. An important example of this class of materials and one which will be used to explain the invention is tire fabric.

Tire fabric is made by calendering rubber, often called gum, onto a reinforcing material called cord. The cord consists of strands laid out in a particular pattern. Usually the strands are in essentially the same plane and most of them run parallel to each other. The remaining strands run at some angle and tie the parallel strands together.

Until recently, tire fabric was made by calendering the rubber onto a textile cord such as polyester. Control of the process was accomplished by measuring the weight per unit area of the finished product and controlling the calender rolls from these measurements to produce an end product with a uniform thickness.

So long as the cord was made of textile, measurement could be accomplished by conventional beta gauges. Recently, however, steel cord has taken the place of textile cord in the manufacture of tire fabric. This has created serious measurement problems since the steel cord is substantially opaque to beta radiation and does not have a constant weight per unit area. Thus the effects of the steel cannot be calibrated out of the beta gauge measurements.

One approach at solving the problem was the use of an X-Ray backscatter gauge on either side of the tire fabric. This approach, however, measured only weight of the rubber on either side of the steel cord and not the weight component of the gum and steel. Further, the X-Ray unit is sensitive to the chemical composition of the rubber. Yet it is important to tire manufacturers to know not only rubber thickness on the cord but rubber weight and steel weight.

OBJECT AND SUMMARY OF THE INVENTION

It is therefore an object of this invention to provide a gauge for measuring rubber weight, steel weight, and total weight of a steel corded tire fabric.

It is another object of the invention to provide a transmission gauge having two radiation sources and two separate detectors in which the cross talk is minimized.

It is another object of the invention to provide a method of very accurately calibrating the above gauge.

In accordance with the above objects there is provided an apparatus for measuring the weight per unit area of metal cord tire fabric which includes a first radiation source and radiation detector for generating a first electrical signal proportional to the radiation received at the detector unit. The first radiation source is such that the rubber absorbs very little of the radiation but the steel in the fabric absorbs a substantial fraction of the radiation so that the radiation received at the first detector is primarily a measure of the metal weight per unit area of the tire fabric. A second radiation source and detector for generating a second electrical signal proportional to the radiation received at the second detector are provided. The second source is such that a substantial fraction of its radiation is absorbed by the rubber and substantially all of the radiation is absorbed or scattered by the metal cord whereby the radiation received at the second detector is primarily a measure of the rubber weight per unit area. Finally, means are provided for combining the first and second signals to form electrical signals proportional to total weight, steel weight and rubber weight per unit area of the tire fabric.

DESCRIPTION OF THE PREFERRED EMBODIMENT

Figure 1:
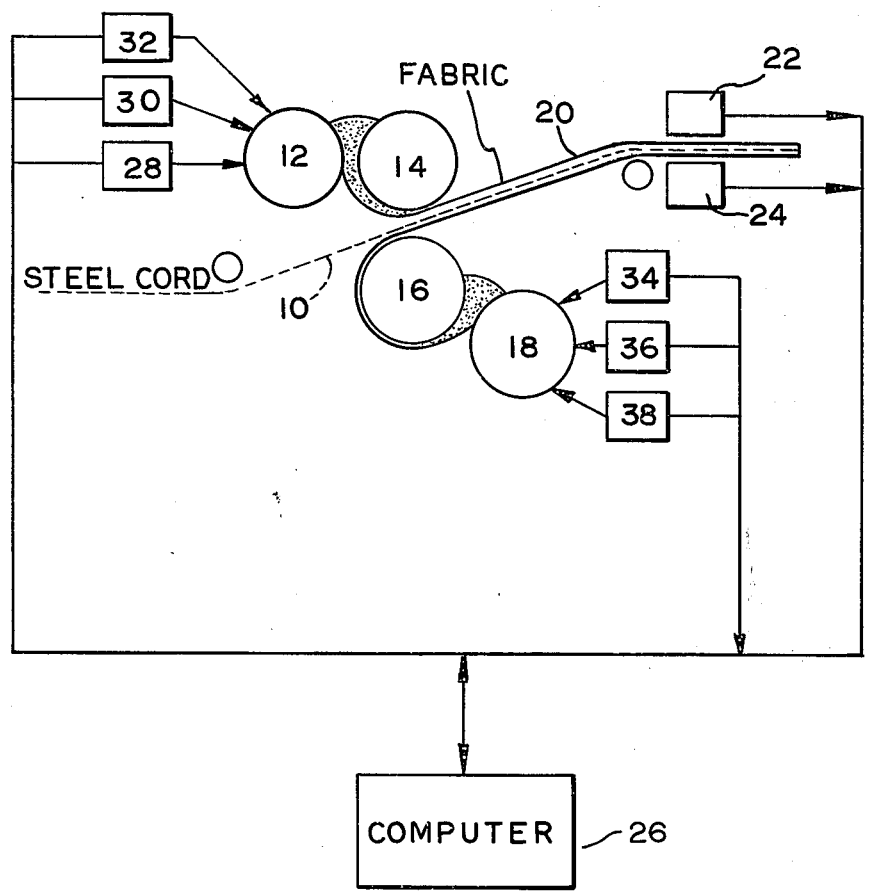
FIG. 1 is a schematic illustration of a calendering process.

FIG. 1 generally shows a tire fabric calender in schematic form. The basic calender arrangement and control scheme are well known except for the gauges. However, a brief description of the equipment and process are important to a complete understanding of the invention.

Referring now to FIG. 1, steel cord 10 is passed through a calender consisting of rollers 12, 14, 16 and 18. Rollers 12 and 14 act together to convert rubber, sometimes called gum, from bulk form to a thin sheet having a carefully controlled thickness. Rollers 16 and 18 act in a like manner. Rollers 14 and 16 work together to apply a sheet of rubber to both sides of steel cord 10 to form tire fabric 20.

The tire fabric emerging from the calender is passed between upper gauging head 22 and lower gauging head 24. From there fabric 20 is wound on reels (not shown) to be cut and formed into tires at a later time.

Measurements from gauging heads 22 and 24 are supplied to a computer where the raw measurements from the gauge are converted to weight per unit area signals for the metal alone, the rubber alone, and the total product.

At this point, the thickness of gum being applied to the cord may be determined from the weight per unit area of rubber signal and the known rubber density.

From these measurements, control strategies are implemented so that the finished product has the right thickness gum on either side of the steel cord. In particular, the sheet is usually divided longitudinally into 3 zones and the thickness in each zone is controlled by well known hydraulic screw-down equipment shown schematically as boxes 28 through 38.

In order to control the sheet in 3 zones, independent measurements must be made in each zone. This is accomplished by using a scanning gauge. Scanners for other sheet processing industries are well known and the details of a preferred embodiment are described in U.S. Pat. No. 3,621,259, entitled "Sheet Gauging Apparatus" and assigned to the same assignee as the present invention.

Figure 2:
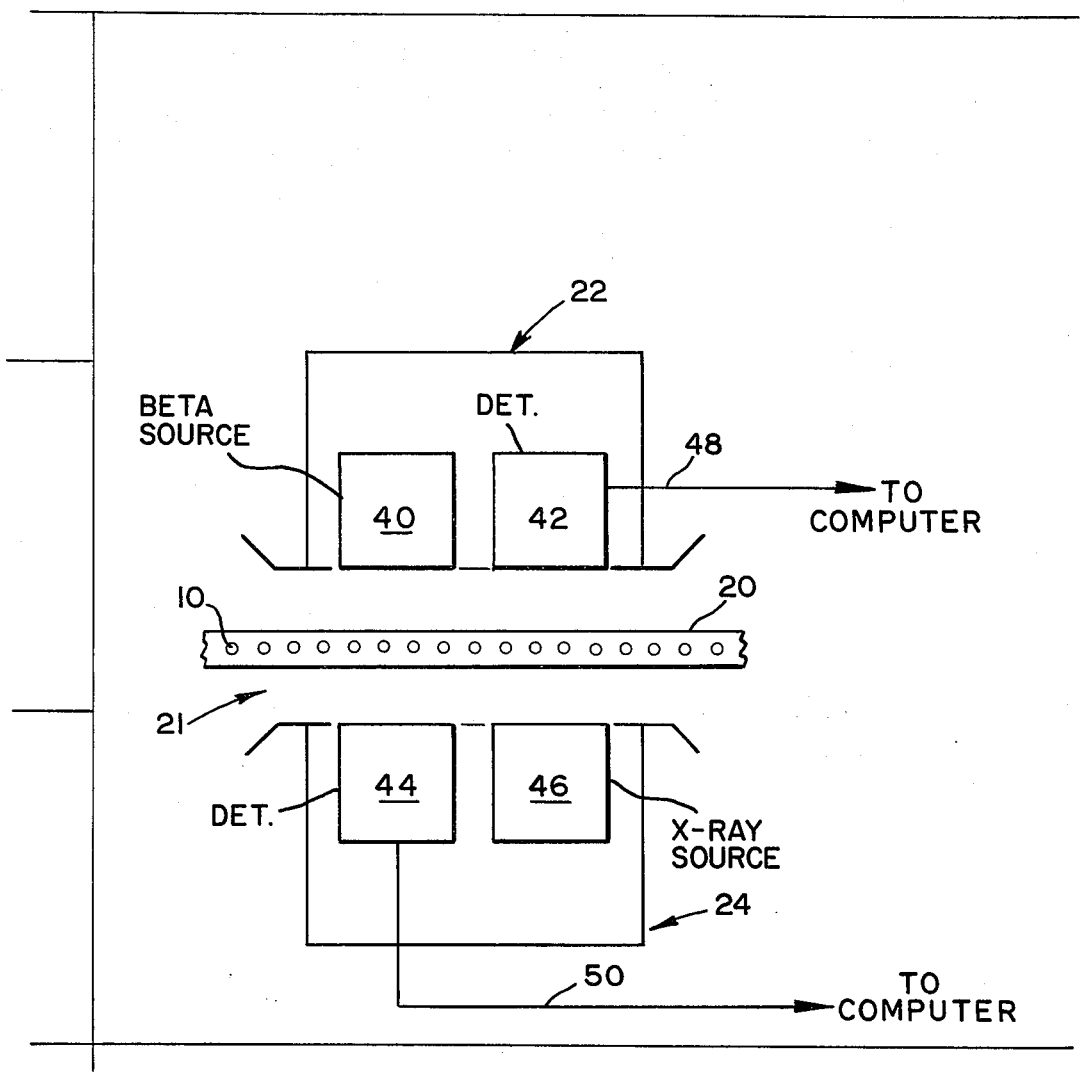
FIG. 2 is a block diagram of the gauging heads according to the present invention.

FIG. 2 is a schematic illustration of a preferred arrangement of source and detector units configured for a transmission gauge embodiment of the invention.

In FIG. 2, tire fabric 20 including steel cord 10 is shown passing between gauging heads 22 and 24. Located in upper head 22 is beta radiation source 40 and an X-ray detector 42. A beta radiation detector 44 and an X-ray source 46 are located in lower head 24. Part of the invention is to purposely avoid having both detectors in the same head. This arrangement avoids cross talk or the expense necessary to reduce it where sensitive electronic circuitry operating with very small signals are squeezed together.

Beta radiation source 40 is well known in the art and is described in detail in U.S. Pat. No. 3,697,755, entitled "Enclosure With a Radiation Source" and having the same assignee as the present invention.

Beta radiation detector 44 may be of the well known ion chamber type or it may be of the scintillation counter type as described in Copending U.S. Patent application, Ser. No. 183,263, filed Sept. 23, 1971, and having the same assignee as the present invention.

Signals from detectors 42 and 44 are supplied to computer 26 via leads 48 and 50 and appropriate well known interfaces.

In the configuration just described two radiation source and detector units are required so that measurements can be made of the two constituent materials — steel and rubber. If the weight per unit area of the steel cord remained constant, only one source would be necessary. The steel could be calibrated out in a manner well known in the art. Unfortunately, the steel cord weight does vary. Thus a separate measurement must be made for it. In a like manner, if a third variable weight material were used, a third source would be necessary.

Depending on the type and thickness of the reinforcing and bulk materials to be measured, the radiation sources are chosen. In making the choice of source type, it is important to understand the theory of operation of radiation absorption gauges.

As is well known, material weight measurements by radiation absorption techniques are based on the Beer-Lambert law which is expressed as follows:

$$I = I_o e^{-\mu x} \quad (1)$$

where $e$ is the natural log base, $\mu$ is the mass absorption coefficient which is a function of the radiation energy from the source and of the type of material being measured, $x$ is the weight per unit area of the material being measured in terms of milligrams per square centimeter, $I_o$ is the intensity of radiation reaching the radiation detector in the absence of the absorbing material, and $I$ is the intensity of radiation reaching the detector in the presence of radiation absorbing material. Equation 1 may be rewritten as follows:

$$R = \frac{I}{I_o} = e^{-\mu x} \quad (2)$$

In this form the left side of equation 2 is a ratio of radiation received with the absorbing material present to the radiation received with the absorbing material absent.

In choosing the two sources, the ratio R is a very important parameter.

To start with, all ratios, R, should be in the useable range. That is, a significant change in the material weight should cause a significant change in the ratio, R.

Also two sources should be chosen such that they are absorbed at substantially different rates by the two different constituent materials, in this case, rubber and steel cord. Ideally, the steel sensitive source should be such that a small fraction of its radiation is absorbed by the rubber (R near 1) and a much larger fraction of its radiation absorbed by the steel cord. The rubber sensitive source should be just the reverse. That is, the steel should block all the radiation either by absorption or scattering so that changes in steel weight will have very little additional effect. However, the radiation should be moderately absorbed by rubber (R in mid-range).

If the constituent materials have substantially the same scattering and absorption characteristics, it is difficult or impossible to distinguish the weights of the constituents separately.

Depending on the thickness of the steel cord and rubber, the high steel sensitive source may be X-ray and the rubber sensitive source beta. Or they may both be X-ray of different energies.

There are several radioisotopes that emit beta radiation, with Strontium 90 being the preferred material for most tire fabric calendering applications. However, a low energy X-ray source such as 12 KV could also be used.

X-Ray source 46 may be of the true electrically generated type well known in the art or it may be a source of gamma radiation such as Americium 241 which is configured in substantially the same manner as the beta source.

On tire fabric of the weights described in the table, Strontium 90 may be used for one source and Americium 241 for the other source.

For finished products having constituent materials with absorption characteristics substantially different than steel cord and gum, different radiation sources must be chosen using the principles as just described.

The gauge as just described may be calibrated by the following method.

By calibration is meant the method by which the measurement data is converted to units useable by humans. In this case, radiation intensity at sensors 42 and 44 is converted to a weight per unit area. This is achieved in the following manner.

Using the foregoing definitions, the calibration method of the present invention will now be described in conjunction with FIG. 3.

The ratio $I/I_o$ is plotted on the Y-axis from 0.00 to 1.00 and the total weight per unit area of the tire fabric is plotted on the X-axis.

A first calibration curve 52 for a beta or other low energy source is constructed for rubber only by placing several reference samples of rubber in the gap 21 between gauging heads 22 and 24 and plotting several points for the curve.

Curve 52 conforms to Beer's law in accordance with the following equation:

$$Q = Q_1 - \frac{1}{\mu_1} \log_e \frac{I_s}{I_a} \bigg/ \frac{I_s^o}{I_a^o} \qquad (3)$$

where $Q$ is weight per unit area, $Q_1$ is the specific weight per unit area of a selected known sample of one of the several samples which is preferably in the middle of the range of intended usage, $I_s$ is the measurements of the received intensity of radiation with the reference samples in the gap, and $I_s^o$ indicates the radiation intensity for the $Q_1$ sample. In order to compensate for the decay of the radiation source, $I_a^o$ is measured which is the received radiation intensity with only air in the radiation path. Thus, the calibration curve 52 is in effect a ratio $R_o = I_s/I_a^o$. The ratio, of course, approaches 1 as the weight per unit area of the sample approaches 0.

$\mu_1$, the mass absorption coefficient, is determined as discussed above by the characteristic of the radiation source and the material. It is calculated as follows:

$$\mu_1 = -\frac{1}{Q_2 - Q_1} \log_e \frac{I_2}{I_1} \qquad (4)$$

where $Q_2$ and $Q_1$ are weights per unit area of samples in the intended range of usage and $I_2$, $I_1$ are the corresponding intensity measurements. The actual calculation of $\mu$ is not normally necessary, but may be if the basis weight gauging system requires a new radiation source or if a radically different type of sheet material is being produced.

Next a second calibration curve 54 for the low energy gauge is constructed for the finished product (tire fabric). Samples of a typical steel cord having a known weight are covered with increasingly thick layers of rubber also having a known weight and are measured by the gauge in the manner just described. The known weight is plotted against ratio in accordance with equation 3.

Next the same procedure is carried out with a gamma ray or other high energy source 40 and detector 44. Curve 56 is a calibration curve for the finished product with a gamma source and is constructed by using the same samples and same method for constructing curve 54.

Curve 58 is for rubber only using the gamma source and is constructed using the same samples and methods used in constructing curve 52.

The gauge actually measures deviations from a known nominal sample having a total weight per unit area $Q_1$ and producing corresponding ratios $R_{BR}$ and $R_{BF}$ from the beta gauge and corresponding ratios $R_{GR}$ and $R_{GF}$ from the gamma gauge.

Where $R_{BR}$ = ratio of the beta gauge for rubber only
$R_{BF}$ = ratio of the beta gauge for the finished product
$R_{GR}$ = ratio of the gamma gauge for rubber only
$R_{GF}$ = ratio of the gamma gauge for the finished product These values are all determined during the calibration procedure.

When the gauge is put into operation, actual radiation $I_B$ and $I_G$ are detected. These actual readings are used to form ratios $R_G$ and $R_B$ where:

$$R_G = \frac{I_G}{I_G^o} \qquad (5)$$

and $$R_B = \frac{I_B}{I_B^o} \qquad (6)$$

and $I_B^o$ and $I_G^o$ are the received radiation with only air in the gap for the beta and gamma sources respectively.

The expression for the total weight per unit area $Q_T$ is:

$$Q_T = Q_1 - \frac{1}{\mu_1} \log \frac{R_B - DR}{R_{BF}} \qquad (7)$$

where $$DR = \alpha(R_{GF} - R_G) \qquad (8)$$

and $$\alpha = \frac{R_{BF} - R_{BR}}{R_{GF} - R_{GR}} \qquad (9)$$

Figure 3:
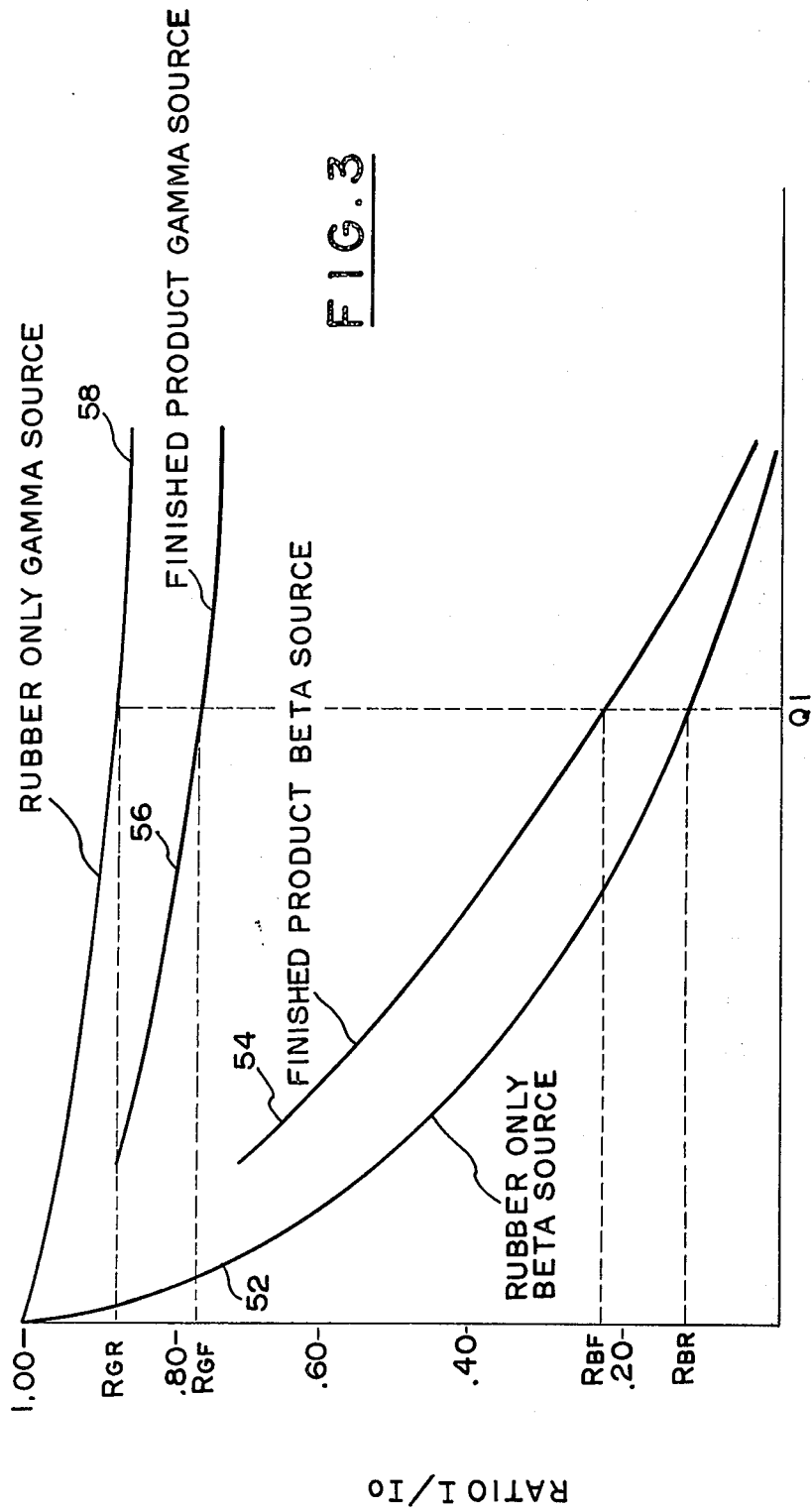
FIG. 3 is a graph useful in understanding parts of the present invention.

As can be seen from FIG. 3, the sensitivity of the beta gauge to changes in steel cord weight is represented by the vertical distance from curve 54 to curve 52. There are in reality an infinite number of calibration curves parallel to curve 52 each representing a different steel cord weight. The numerator of equation 7 represents the difference in response of the beta gauge to a reference sample of weight $Q_1$ with rubber only and with a nominal steel cord weight.

The denominator of equation 9 represents the difference in response of the gamma gauge to the same reference sample $Q_1$ with rubber only and with a nominal steel cord weight. The ratio of these two differences represents the relative sensitivity of the two gauges to changes in steel weight.

Equation 8 is the product of the steel weight ratio $\alpha$ times a factor that indicates how much the actual steel weight has varied from the nominal steel weight. If the measured steel weight ratio $R_G$ is the same as the nominal steel weight ratio $R_{GF}$, then DR is zero.

Thus, in summary any variations in the steel weight from nominal are detected by the gamma gauge and used to adjust the calibration curve of the beta gauge.

The steel weight per unit area $Q_s$ may be found by relating the actual measurement $R_G$ back to the nominal $Q_1$ according to the following expression:

$$Q_s = Q_1 \frac{R_G + \frac{\Delta R_{GF}}{\Delta Q}(Q_T - Q_1) - R_{GR}}{R_{GF} - R_{GR}} \qquad (10)$$

where $\Delta R_{GF}/\Delta Q$ is the slope of the finished product gamma source curve 56.

The rubber weight per unit area $Q_R$ is then:

$$Q_R = Q_T - Q_S$$

(11)

Following this method, the raw radiation intensity signals from the gauges are converted to accurate weight per unit area signals which may then be used to compare against targets for these values. Any resulting error signal from these comparisons are then used to adjust the process screwdown equipment 28 through 38 to achieve a more uniform finished product.

What is claimed is:

1. Apparatus for measuring the weight per unit area of various constituents of a tire fabric manufactured by calendering rubber onto both sides of a metal cord, comprising:

a first radiation source and radiation detector for generating a first electrical signal proportional to the radiation received at said first radiation detector, said first source being such that the rubber in said fabric absorbs a first fraction of said radiation and the metal cord in said fabric absorbs a second fraction, said second fraction being greater than said first fraction of said radiation whereby the radiation received at said first detector is primarily a measure of the metal weight per unit area of said tire fabric;

a second radiation source and detector for generating a second electrical signal proportional to the radiation received at said second detector, said second source being such that a first fraction of its radiation is absorbed by said rubber and a second fraction of its radiation is absorbed or blocked by said metal cord whereby the radiation received at said second detector is primarily a measure of the rubber weight per unit area; and means for combining said first and second signals to form a third electrical signal proportional to the total weight per unit area of said tire fabric.

2. The apparatus of claim 1 wherein said first radiation source is a beta source and said second radiation source is an x-ray source.

3. The apparatus of claim 1 wherein said first radiation source is Strontium 90 and said second radiation source is Americium 241.

4. The apparatus of claim 1 further including means for combining said first and second signals to form a fourth electrical signal proportional to the weight per unit area of said metal cord.

5. The apparatus of claim 4 further characterized by means of combining said third and fourth signals to form a fifth electrical signal proportional to the weight per unit area of gum in said tire fabric.

6. The apparatus of claim 1 wherein said first and second radiation source and detector units are in a backscatter configuration.

7. The apparatus of claim 1 wherein said first and second radiation source and detector units are in a transmission configuration.

8. The apparatus of claim 7 wherein said first radiation source and said second detector are located on the same side of said tire fabric.

9. Apparatus for measuring the weight per unit area of a manufactured sheet product consisting of a first material layer having a first scattering or absorption characteristic and a second material layer having a second scattering or absorption characteristic and wherein said first characteristic is different from said second characteristic, said apparatus comprising:

a first radiation source and radiation detector for generating a first electrical signal proportional to the radiation received at said first radiation detector, said first source being such that said first material layer in said product absorbs or scatters a first fraction of said radiation and said second material layer in said product absorbs or scatters a second fraction, said second fraction being different than said first fraction of said radiation;

a second radiation source and detector for generating a second electrical signal proportional to the radiation received at said second detector, said second source being such that a first fraction of its radiation is absorbed or scattered by said first material layer and a second fraction of its radiation is absorbed or scattered by said second material layer, said first and second fractions from said first source being different than the respective first and second fractions of said second source; and means for combining said first and second signals to form a third electrical signal proportional to the weight per unit area of a particular constituent of said product.

* * * * *